United States Patent [19]
Blakeley et al.

[11] Patent Number: 5,484,120
[45] Date of Patent: Jan. 16, 1996

[54] SUPPORT STRUT FOR RAM AIR DRIVEN TURBINE

[75] Inventors: Anthony Blakeley; Timothy S. Konicek; Gregory E. Horihan, all of Rockford; William D. Sherman, Hampshire, all of Ill.

[73] Assignee: Sundstrand Corporation, Rockford, Ill.

[21] Appl. No.: 212,549

[22] Filed: Mar. 11, 1994

[51] Int. Cl.⁶ .......................... B64D 27/00; B64D 41/00; F02C 7/20
[52] U.S. Cl. ................ 244/54; 244/56; 244/58; 248/554; 416/142; 60/39.31
[58] Field of Search ................ 416/142, 170 R; 60/698, 39.31; 244/54, 55, 56, 58, 65, 66; 248/554, 555; 428/36

[56] References Cited

U.S. PATENT DOCUMENTS

| | | | |
|---|---|---|---|
| 1,671,865 | 5/1928 | Karish | 244/56 |
| 2,945,262 | 7/1960 | Petty | 18/55 |
| 3,219,123 | 11/1965 | Stocker | 170/159 |
| 3,318,554 | 5/1967 | Ward et al. | 244/54 |
| 4,411,596 | 10/1983 | Chilman | 244/58 |
| 4,456,204 | 6/1984 | Hapke | 244/58 |
| 4,676,458 | 6/1987 | Cohen | 244/58 |
| 4,710,412 | 12/1987 | Darrieux | 428/36 |
| 4,720,244 | 1/1988 | Kluppel et al. | 416/224 |
| 4,742,976 | 5/1988 | Cohen | 244/58 |
| 4,991,796 | 2/1991 | Peters et al. | 244/58 |
| 5,123,614 | 6/1992 | Whitehouse | 244/54 |
| 5,174,719 | 12/1992 | Walsh et al. | 244/58 |

FOREIGN PATENT DOCUMENTS 8702642  5/1987  WIPO ................ 244/58

*Primary Examiner*—Andres Kashnikow
*Assistant Examiner*—Virna Lissi Mojica
*Attorney, Agent, or Firm*—Lawrence E. Crowe

[57] ABSTRACT

The difficulty and expense of fabricating a support strut for a ram air driven turbine are reduced by providing an axially opening channel in a central portion of the strut. Blockage of a portion of the airstream flowing through the ram air turbine and past the strut is reduced by extending the axially opening channel through the entire axial length of the strut. Apparatus for converting or transferring power generated by the ram air turbine to a point of use, such as an aircraft, is routed through the axially opening channel, thereby allowing convenient access to such apparatus. A strut design is provided which may be readily manufactured as a single unitary structure from a variety of metallic and non-metallic materials including fiber reinforced composites.

21 Claims, 12 Drawing Sheets

SUPPORT STRUT FOR RAM AIR DRIVEN TURBINE

FIELD OF THE INVENTION

The present invention relates generally to a ram air turbine driven auxiliary power system for an aircraft, and more particularly to an improved support strut for attaching the ram air turbine to the aircraft. This invention provides a strut which is readily manufactured from composite materials, and offers other significant advantages in comparison to prior struts regardless of the material utilized.

BACKGROUND OF THE INVENTION

Ram air turbine (RAT) driven auxiliary power systems are commonly used in the aircraft industry to provide power for "add-on" equipment such as pod mounted aerial refueling equipment or weapons systems. In addition, most modern commercial and military aircraft carry a RAT driven auxiliary power unit to provide a source of emergency hydraulic or electrical power for critical flight controls and landing gear, should the aircraft experience a total loss of power from all engines.

In a typical RAT driven auxiliary power unit, the actual ram air turbine, which looks very much like an aircraft propeller, is mounted on the outboard end of a support strut attached to the aircraft and extending into the surrounding airstream. The RAT is coupled by a drive mechanism to drive one or more power converting devices, such as a hydraulic pump or an electrical generator.

During flight, the airstream generated by the forward motion of the aircraft causes the RAT to rotate. The RAT drives the pump or generator to produce hydraulic or electrical power which is delivered through hydraulic lines or electrical cables to the appropriate aircraft system.

The power converting devices are typically located either within the aircraft fuselage, or mounted on the strut.

Where the power converting devices are located within the fuselage, the drive mechanism must often follow a torturous path through the strut in order to connect the RAT to the power converting device. A complex drive mechanism is usually required in such instances. This is particularly true in those instances where the strut must pivot about an axis located within the aircraft, such that the auxiliary power unit may be pivoted between a stowed position within the aircraft and a deployed position outside the aircraft.

In general, where the power converting device is located within the fuselage, the common practice has been to fabricate a strut with a cylindrical cross section and to route the drive mechanism through the inside of the cylinder. U.S. Pat. Nos. 4,742,976; 4,991,796; and 5,174,719, which are assigned to the assignee of the present invention, are illustrative of this approach. While this approach does provide certain benefits, such as protecting the drive mechanism from the elements and inherent resistance of the strut to torsional loading, there are also significant penalties incurred due to the difficulty involved in fabricating a hollow strut. Furthermore, assembly and repair of the drive system within the enclosed strut often requires that special provisions be made to allow access, or that the strut be assembled from multiple parts.

Mounting the power converting device on the outboard end of the strut greatly reduces the problem of connecting the drive mechanism to the RAT. Even with this approach, however, hydraulic lines or electrical cables must still be routed through the strut in order to transmit the converted power from the power converting device to the aircraft. If cylindrical struts, or struts having other internal passages are used to route the lines or cables through the interior of the strut, the difficulties involved in fabricating a hollow strut are not avoided. Also, unless additional access features are provided, it is difficult if not impossible to include convenient intermediate connections within the strut to facilitate connection of the hydraulic lines or cables.

Hollow, cylindrical shaped struts are inherently difficult to fabricate. This is particularly true where the strut must also incorporate complex features such as mounting bosses, bolt flanges or access covers. Casting or molding are typically the manufacturing methods of choice for economical fabrication of such structures. In order to cast or mold such shapes, however, complex multi-part tooling and fungible cores are typically required. Alternatively, the strut is fabricated in several parts which are bolted or welded together to produce the strut. Secondary machining operations are typically required. The need for complex tooling, fungible cores, multi-part construction, and secondary machining or joining operations drives fabrication costs up.

This is particularly true for structures fabricated from fiber reinforced composite materials, wherein features such as bolted joints are highly undesirable. Bolted joints are difficult to accommodate in a composite structure without severely impacting structural integrity. As a result, the complex, hollow cylindrical, shape utilized for prior RAT support struts has largely precluded the use of composite materials. Accordingly, the significant advantages offered through the use of composite materials, such as reduction in weight, superior corrosion resistance, high specific stiffness, and virtually unlimited fatigue life, could not be utilized to advantage in prior RAT support struts.

What is needed then, is a new RAT support strut configuration which is readily manufacturable at low cost from a variety of metallic and non-metallic materials including fiber reinforced composites. Ideally, such a new strut would be readily molded in a single step as a one-piece unitary structure.

SUMMARY OF THE INVENTION

Accordingly, it is an object of this invention to provide an improved ram air turbine driven auxiliary power unit having components which are easily fabricated, assembled and repaired. Other objects include providing:

1. A lightweight and inexpensive strut having superior structural characteristics;
2. A lightweight strut which may be readily manufactured at low cost from a variety of metallic and nonmetallic materials;
3. A lightweight strut which may be readily manufactured at low cost from fiber reinforced composite materials;
4. A one piece strut;
5. A strut which minimizes blockage of a portion of the airstream flowing through the RAT and past the strut;
6. Improved aerodynamic and mechanical efficiency of the RAT and mechanical drive apparatus;
7. A reduction in noise generated by the RAT; and
8. A RAT driven auxiliary power unit having minimal drive apparatus connecting the RAT to a power converting device.

These and other objects of the present invention are attained in an auxiliary power unit having a ram air driven turbine (RAT) mounted for rotation about an axis within a housing attached to one end of a support strut. The opposite end of the support strut is configured as a mounting boss for attaching the strut to an aircraft. The housing and mounting boss are rigidly connected by a central portion of the strut which extends radially outward from the housing to the mounting boss. The central portion of the strut includes an axially opening channel.

In one embodiment of the invention, the RAT drives a power converting device, such as an electrical generator or a hydraulic pump, which is attached to the housing. Power generated by the RAT is delivered to the aircraft through interconnecting apparatus, such as electrical cables or hydraulic lines, which are routed through the axially opening channel in the strut. In a preferred version of this embodiment, the power converting device is mounted directly on a shaft extending from the RAT, so that no drivetrain apparatus is required.

In another embodiment of the invention, the RAT drives a power converting device, such as an electrical generator or a hydraulic pump, which is located within the fuselage of the aircraft. The RAT is connected to the power converting device by a drivetrain passing through the axially opening channel in the strut. Power generated by the RAT and converted by the converting device is delivered to the aircraft through interconnecting apparatus, such as electrical cables or hydraulic lines, which may also be routed through the axially opening channel in the strut.

The power conversion device may alternatively be located within the central portion of the strut, with such drivetrain or interconnecting devices as may be required being routed through the axially opening channel.

In a preferred embodiment of the strut, the axially opening channel extends through the entire axial length of the strut, thereby reducing the blockage effect of the strut by allowing a portion of the airstream flowing through the RAT and past the strut to pass through the axially opening channel.

In another preferred embodiment, the strut is fabricated as a one-piece unitary structure from fiber reinforced composite material.

Other objects, advantages, and novel features of the present invention will be readily apparent upon consideration of the following drawings and detailed description of the preferred embodiments.

DESCRIPTION OF THE PREFERRED EMBODIMENT

Figure 1:
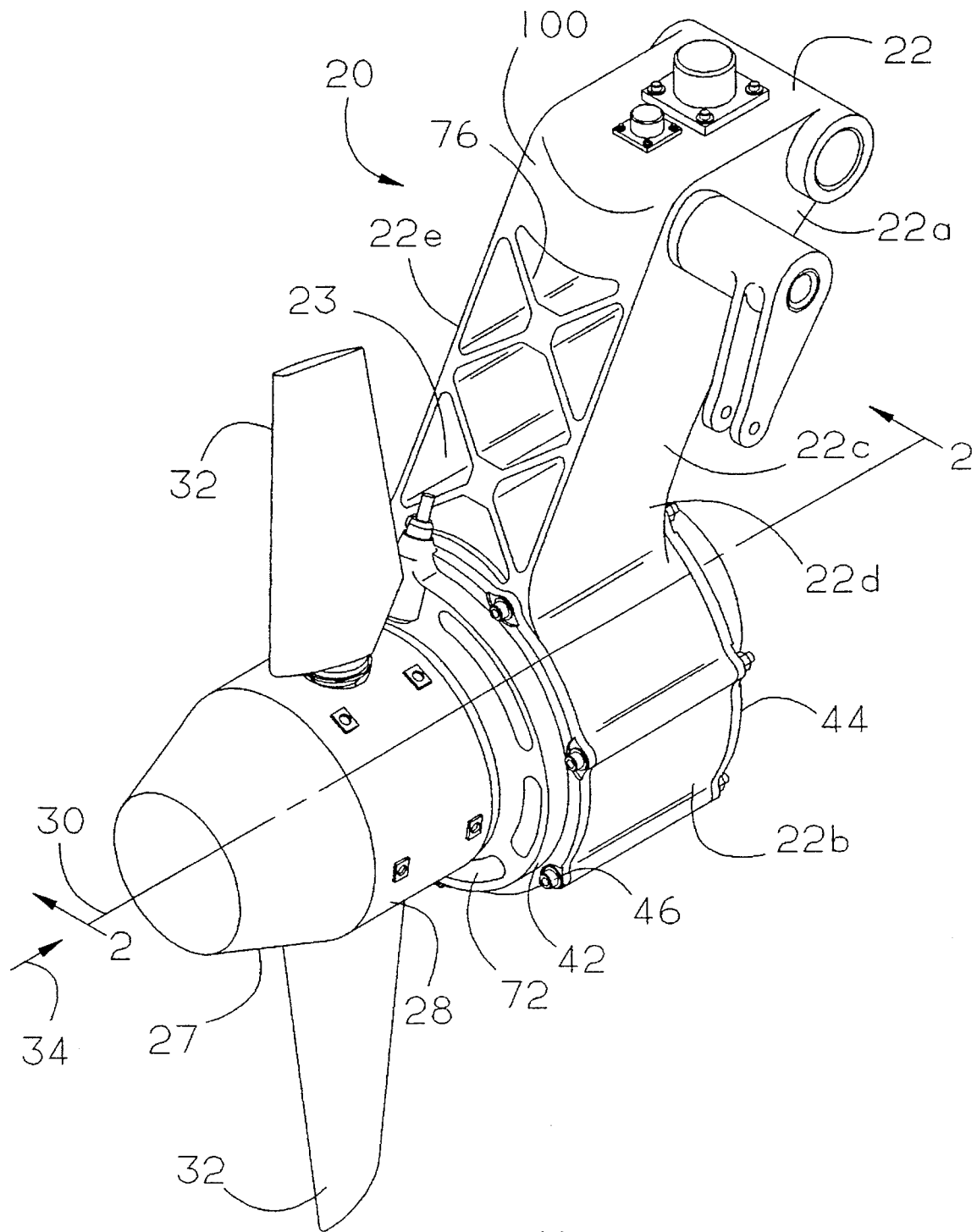
FIG. 1 illustrates a ram air turbine (EAT) driven emergency power unit for an aircraft according to the invention.
Figure 2:
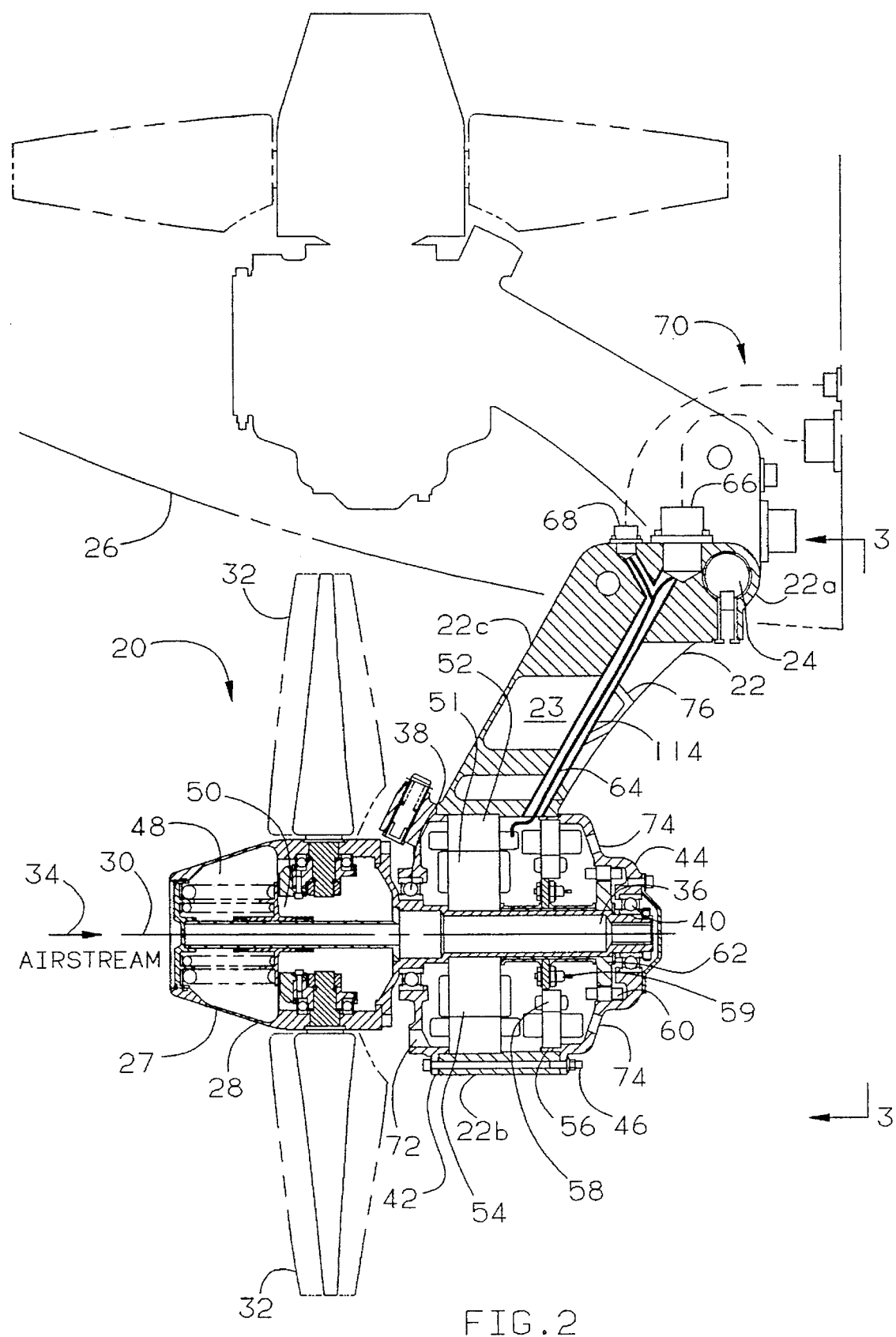
FIG. 2 is a longitudinal cross sectional view of the RAT driven emergency power unit of FIG. 1.
Figure 3:
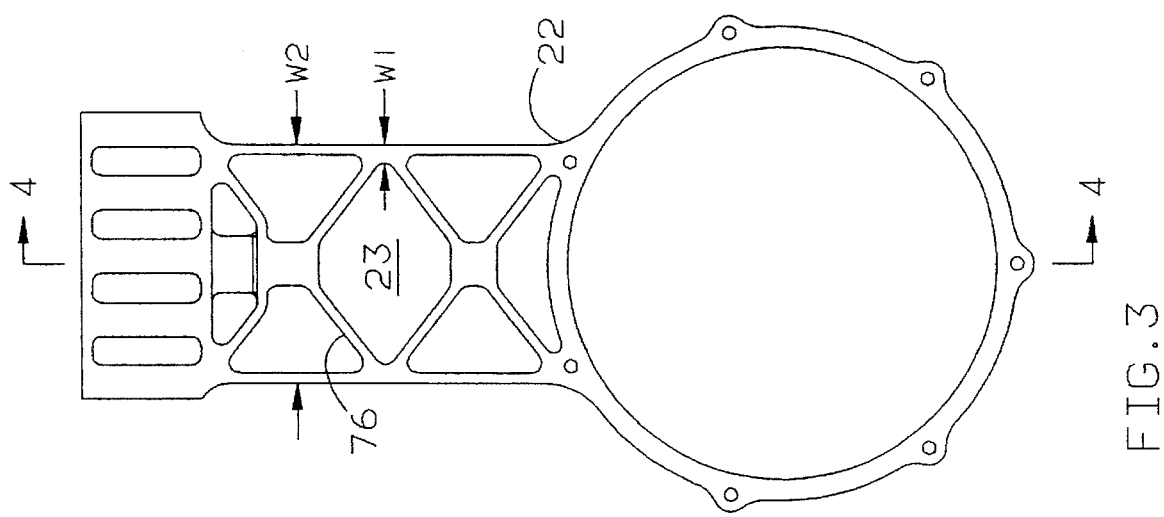
FIG. 3 is a view of the downstream face of a support strut of the RAT driven emergency power unit of FIG. 1.

FIGS. 1–3 depict an exemplary embodiment of the invention in the form of a ram air turbine driven emergency power unit for an aircraft. In the exemplary embodiment, the RAT drives an electrical generator. However, it is specifically noted that the teachings of the present invention are not limited to the exemplary embodiments depicted herein.

As seen in FIGS. 1 and 2, the emergency power unit 20 includes a support structure in the form of a strut 22. One end of the strut 22 is configured as a mounting boss 22a for attaching the strut 22 to the aircraft. As shown in FIG. 2, the mounting boss 22a is configured to allow the emergency power unit 20 to be pivotably attached, as indicated at 24, within a stowage compartment of an aircraft, schematically indicated by dashed lines 26. The opposite distal end of the strut 22 is configured as a generally annular shaped housing 22b disposed about an axis 30. A ram air driven turbine (RAT) 27 includes a hub 28 which is mounted within the housing 22b in a manner allowing the hub 28 to rotate about the axis 30. A pair of turbine blades 32 are attached to the hub 28 and extend radially outward from the hub 28. The blades 32 convert energy from an airstream 34 directed past the blades 32 into torque. This torque is applied to the hub 28 at the point of attachment of the blades 32 to the hub 28, thereby causing the hub 28 to rotate about the axis 30.

As best seen in FIG. 2, a shaft 36 extending from the downstream or rear end of the hub 28 is journaled for rotation within bearings 38, 40. Bearings 38 and 40 are mounted in end bells 42, 44 which are attached to opposite ends of the housing 22b by tie-rods 46. The hub 28 is generally annular in construction and defines an internal cavity 48 which houses a number of elements including springs, flyweights, and cam followers, which in combination comprise a mechanical blade pitch control and speed governing system, generally indicated as 50.

The exemplary embodiment utilizes an electrical generator in the form of an air-cooled brushless alternator 51, of typical construction. The alternator 51 is located within the housing 22b at the distal end of the strut 22, thereby eliminating the need for a complex drive mechanical passing through the strut. The brushless alternator 51 includes a main generator having a stator 52 which is press fitted directly into the annular housing 22b, and a main rotor 54 which is attached directly on the shaft 36. The brushless alternator 51 also includes an exciter generator and a permanent magnet generator (PMG) having their respective stators 56, 60 press fitted into the aft endbell 44, and their respective rotors 58, 62 attached directly to the shaft 36. A rotating rectifier 59 is also attached directly to the shaft 36. By press fitting the stators 52, 56, 60 directly into the housing 22b and the aft endbell 44, the need for a separate generator housing is eliminated, thereby reducing complexity and cost of the generator. Attaching the rotors 54, 58, 62, and the rotating rectifier 59 directly to the shaft 36 eliminates the need for a drivetrain or coupling means for attaching the RAT to the generator. Since the drivetrain is often one of the more complex and expensive elements of a RAT driven auxiliary power unit, attaching the rotors 54, 58, 62, and rotating rectifier 59 directly to the shaft 36 provides considerable savings in complexity and cost.

When the emergency power system 20 is deployed during flight, the airstream 34 causes the PAT 27 to rotate, and drive the brushless alternator 51. The PMG rotor 62 induces an alternating current in the PMG stator 62. The alternating current from the PMG stator 62 is rectified by a stationary rectifier (not shown) and supplied to the exciter stator 56. The exciter stator 56 magnetically induces an alternating current in the exciter rotor 58. The alternating current induced in the exciter rotor 58 is rectified by the rotating rectifier 59 and supplied to field coils within the main rotor 54. The main rotor 54 generates a rotating magnetic field which induces an alternating current in armature windings of the main stator 52. This alternating current is supplied via wire harness 64, which passes through the strut 22, to electrical connectors 66, 68 attached to the mounting boss 22a of the strut 22. Power cables connected to electrical connectors 66, 68 transfer the alternating current generated by the emergency power unit to the aircraft, as schematically indicated at 70. The rotational speed of the PAT is maintained constant by the governing system 50, in order to maintain the alternating current provided to the aircraft at a constant frequency. Cooling air for the brushless alternator enters the housing 22b through inlets 72, in the forward end bell 42, and exits through outlets 74 in the aft end bell 44.

As best seen in FIG 1, the mounting boss 22a and the housing 22b of the strut are rigidly connected by a radially extending central portion 22c of the strut 22. The central portion 22c of the strut includes a first and a second leg member 22d, 22e which are spaced with respect to one another to form an axially opening channel 23 therebetween. As seen in FIGS. 1–3 the strut may also include one or more transverse support webs 76 extending between the first and second members 22d, 22e, through the axially opening channel 23, to provide additional structural resistance to loads incident with service.

As illustrated in FIGS. 1 and 2, the axially opening channel 23 extends through the full axial length of the strut 22, and substantially between the mounting boss 22a and the housing 22b, thereby allowing a portion of the airstream 34 flowing through the RAT and past the strut to flow directly through the central portion 22c of the strut 22. By virtue of this construction, a relatively wide strut may be utilized without incurring significant blockage of the airstream 34 downstream from the RAT 27.

A wide strut provides efficient utilization of structural materials and inherent resistance to torsional forces without resorting to the closed cylindrical construction typically utilized in prior struts. Generally, the blockage effect of a strut will be measurable upstream from the strut at a distance equal to three times the width of the any element of the strut 22. As illustrated in FIG. 3, this distance is very short for a strut 22 having an opening therethrough and a small element width w1, as compared to a strut without an opening and having a width as illustrated by w2.

Blockage of the airstream downstream of the RAT 27 can cause upstream disturbances which adversely affect performance of the RAT 27, and impose undesirable cyclic stresses on the blades 32. In addition, noise generated by the RAT may be increased. For these reasons it will be appreciated that the open construction as depicted in FIGS. 1–3 provides significant advantages in performance and life of the emergency power unit.

The axially opening channel 23 also provides significant advantages in fabricating the strut 22 by eliminating the need for complex tooling or machining operations which were often required to produce prior struts having closed cylindrical cross sections.

Figure 5:
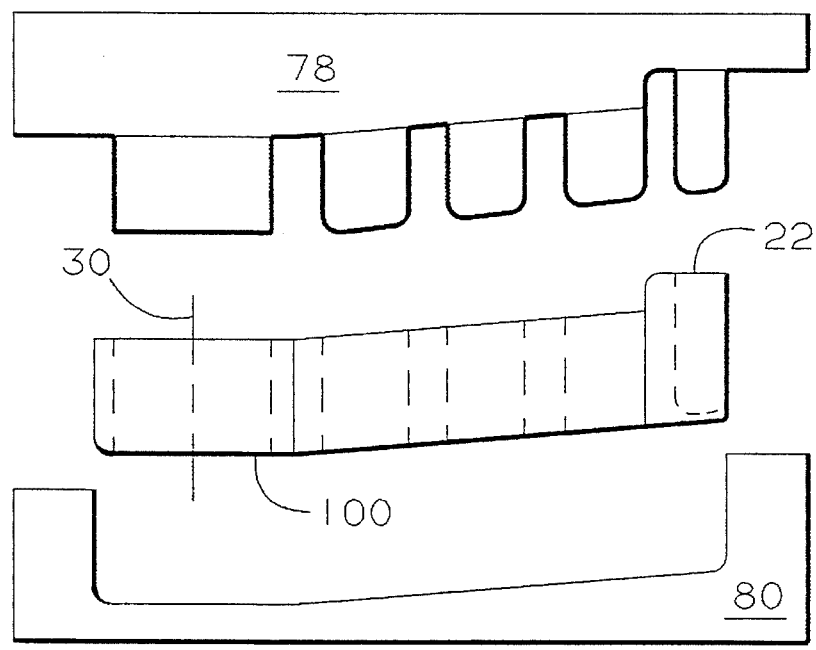
FIGS. 5–9 illustrate alternate methods of manufacturing a support strut according to the invention.

As shown in FIG. 5, a strut 22 having an axially opening channel according to the invention may be either cast or molded in a simple two piece tool 77, having a male half 78, and a female half 80.

To cast the strut 22, the tool is closed and molten metal or liquid polymer based material is injected into the tool 77 to fill the cavity defined between the male and female halves 78, 80 of the tool 77. After allowing the metal to cool, or the polymer to set, the strut 22 can be removed from the tool in a "near net shape" condition requiring little additional machining to achieve its final form. Complex features such as the support struts 76 may be formed without difficulty and without resorting to the use of fungible cores which were required to produce prior struts having closed cylindrical cross sections.

Figure 6:
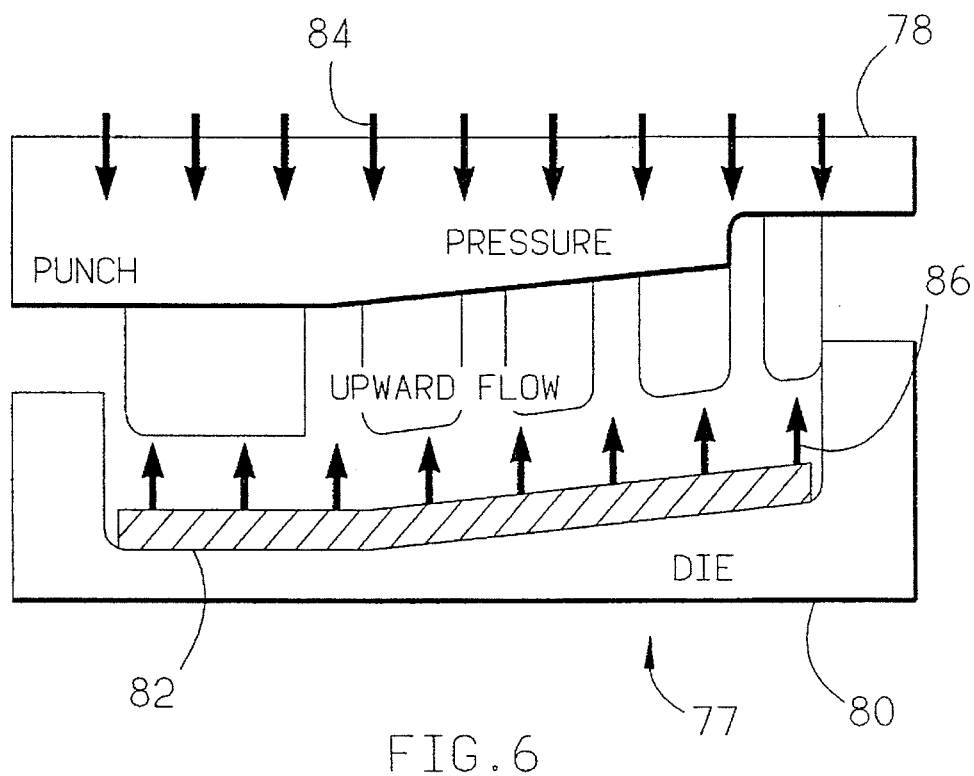

To mold the strut as seen in FIG. 6, a charge 82 of material is placed in the female half 80 of the tool 77 prior to closing the tool 77. The tool is then closed under pressure applied by the male half 78 of the tool 77, as indicated by arrows 84, causing the charge 82 of material to flow, as indicated by arrows 86, into the cavity defined between the male and female halves 78, 80 of the tool 77. Depending on the material used, heat may be applied prior to closing the mold, or during molding to cause the charge 82 to liquify or cure.

Figure 7:
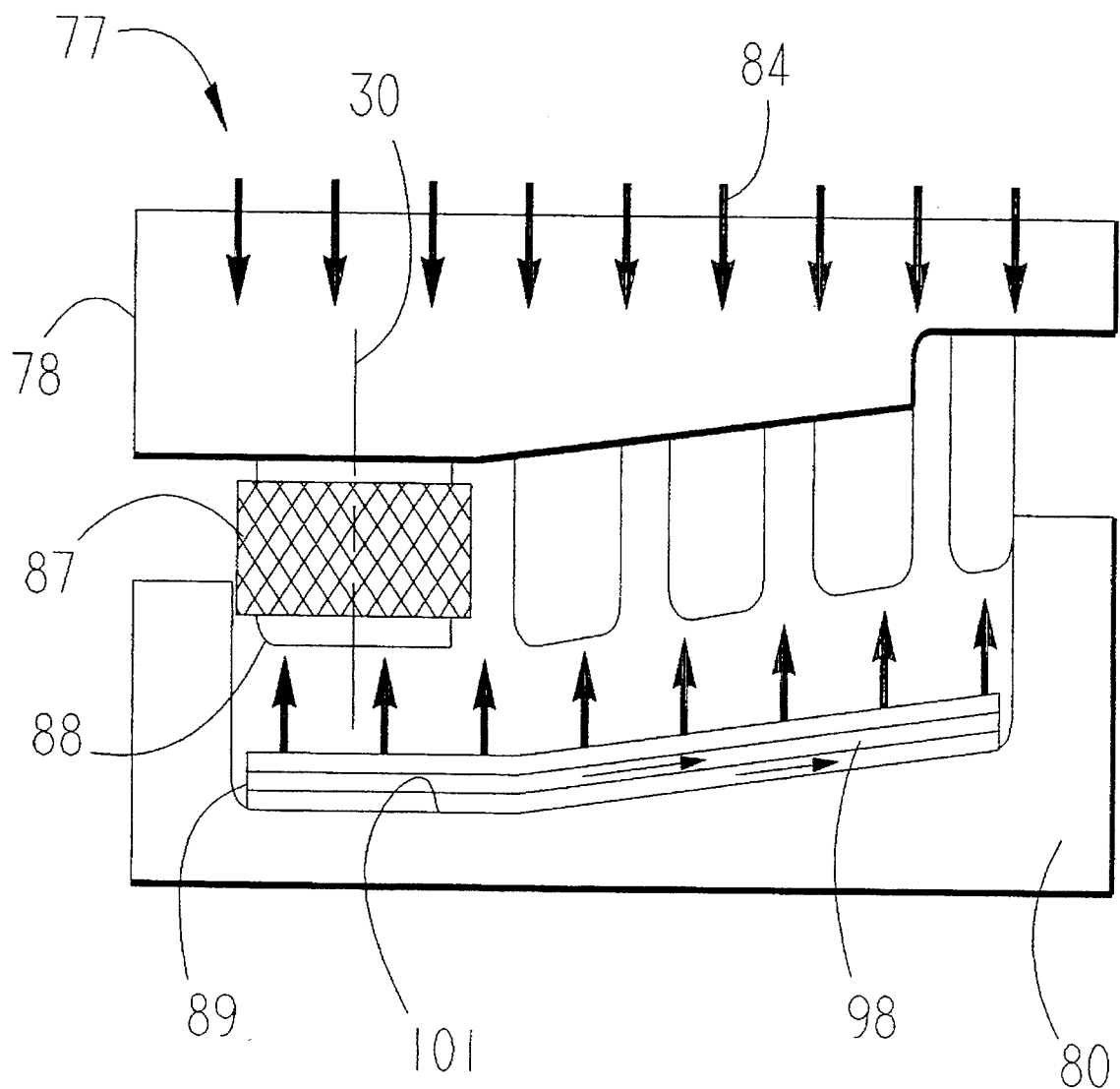

As indicated in FIG. 7, preformed reinforcements 87 may also be inserted into the tool 77 prior to casting or molding in order to provide desirable anisotropic material properties in the finished strut. For example, an annular shaped preform 87 may be placed around the portion 88 of the male half 78 of the tool 77 which defines the interior surface of the annular housing 22b portion of the strut 22. Such a preform 87 might include fibers of high strength material oriented in primarily circumferential direction, in order to increase hoop strength of the annular shaped housing 22b. Alternatively, such reinforcement might be formed from a material selected such that the resulting housing 22b exhibits a coefficient of thermal expansion closely matching a component press fitted into the housing 22b, such as the main stator 52 of the exemplary embodiment 20. Without such a match between coefficients of expansion, it is difficult to maintain a press fit over a wide range of temperatures, such as an aircraft might encounter during operation.

Figure 8:
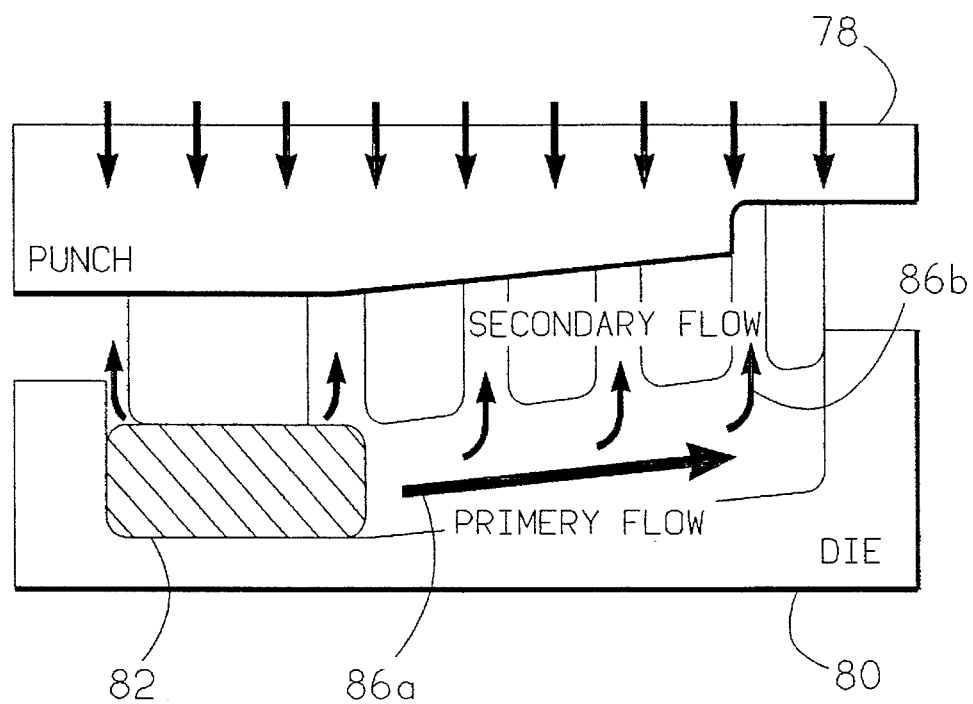

A strut 22 as taught by the invention may be readily molded or cast as a single unitary structure from fiber reinforced composite materials having chopped fibers suspended in a polymer matrix. These materials offer a significant additional advantage in that the fibers tend to preferentially align themselves with the direction of flow as the charge flows to fill the cavity between the male and female halves 78, 80 of the tool 77. As shown in FIG. 8, the fibers can be induced to align themselves along various primary and secondary flow paths 86a, 86b, through judicious placement of the charge 82. By aligning these flowpaths in directions matching the major stresses on the strut 22, a highly efficient structure having specifically tailored anisotropic material properties can be readily produced at low cost.

Figure 9:
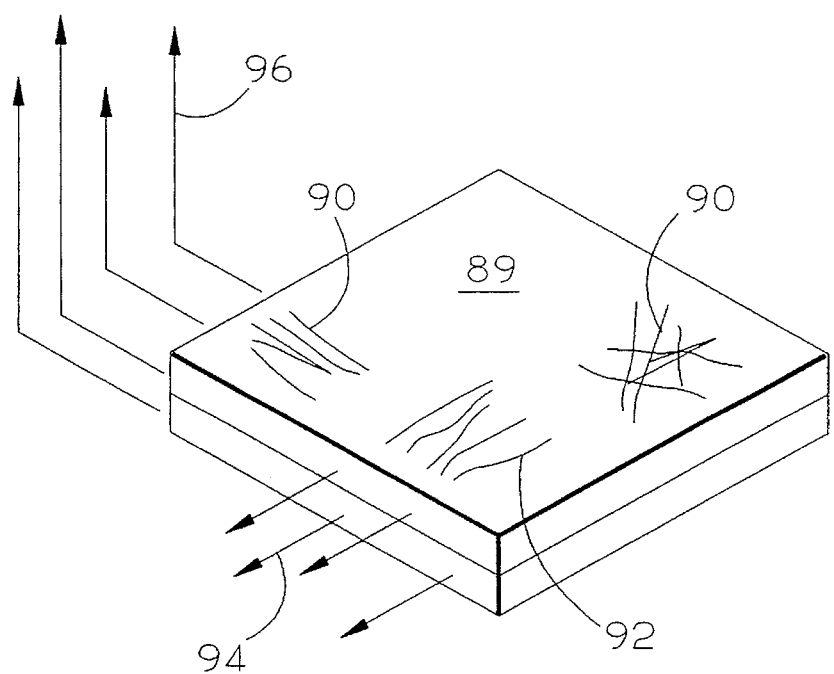

The inventors have found that the manufacturing techniques taught above can be utilized with particular advantage when the charge is fabricated from composite materials in a form commonly known as sheet molding compounds. Sheet molding compounds are commonly supplied in the form of planar sheets 89 of material, as illustrated in FIG. 9, having fibers of a reinforcement material such as carbon suspended in a polymer matrix. With such materials the fibers tend to be prealigned in a relatively two-dimensional fashion within the planar sheets 89 as indicated at 90 in FIG. 9. As the composite material of the charge flows during the molding process, the fibers tend to align along the flow directions as previously described and illustrated at 90, and 92 in FIG. 9. However, they tend to flow most readily in a laminar, two-dimensional fashion, as illustrated at 94 of FIG. 9, along planes defined by the initial placement of planar sheets 89. This tendency to exhibit laminar in-plane flow exists even where the flow must change direction, as indicated at 96 in FIG. 9.

The tendency to flow along generally laminar directions makes the flow of sheet molding compounds more predictable than other forms of composite materials, such as bulk molding compounds. In addition, experience of the inventors has shown that the pre-alignment of the fibers into planar sheets 89 allows a strut 22 to be produced, by the methods described above, having higher strength and more highly anisotropic properties than a strut produced from other forms of composite materials, such as bulk molding compounds.

For the strut 22 described in the exemplary embodiment, a sheet molding compound having a thickness of about 0.100 inch and relatively long fibers, in the range of ½ to 1 inch in length, suspended in a thermosetting polymer matrix has been shown to produce superior structural properties. One example of such a sheet molding compound is a product sold under the tradename of LYTEX 4149/9063 by Quantum Composites.

one charge placement which is believed to provide such superior properties, even without the preform 87, is illustrated at 98 in FIG. 7. As shown in FIG. 7, the planar sheets 89 are placed in the female half 80 of the tool 77 along a surface 101 which defines the forward face 100 of the strut. The planar sheets 89 are stacked in layers extending perpendicularly to the axis 30. As pressure, indicated by arrows 84, is applied by the male half 78 of the tool 77, the charge is compressed, and the fibers tend to align in laminar layers oriented radially and axially with respect to the axis 30. As a result, a strut having superior resistance to bending and torsional loads is produced.

Figure 4:
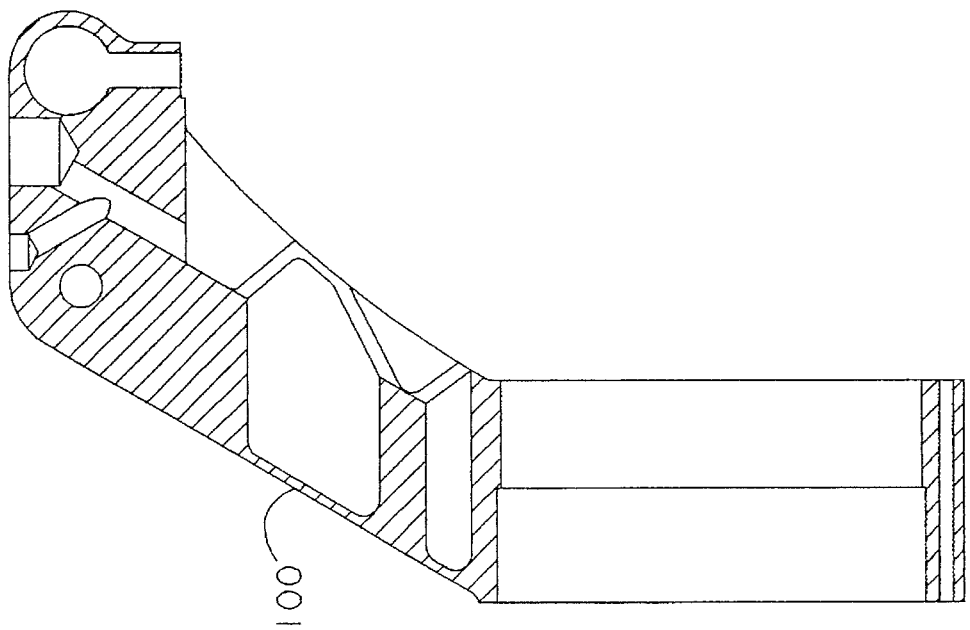
FIG. 4 illustrates an alternate embodiment of the support strut of FIG. 3.
Figure 13:
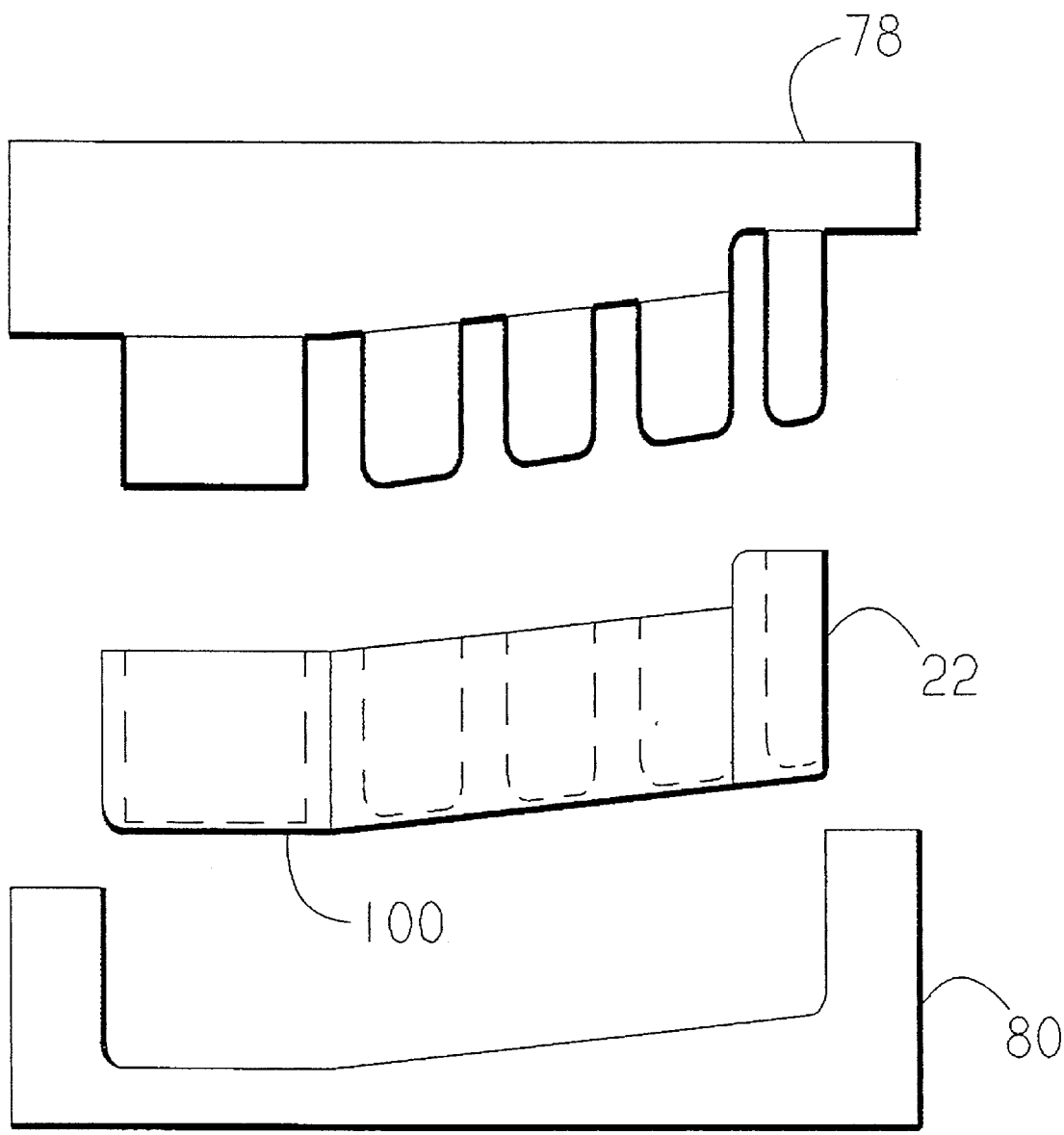

FIGS. 4 and 13 illustrate an alternate embodiment of the strut 22 having a closed forward face formed by a transversely extending wall 100 mutually joining the first and second leg members 22*d*, 22*e* the mounting boss 22*a* and the housing 22*b*. As illustrated in FIG. 13 such a strut may be readily manufactured by the techniques described above.

Figure 10:
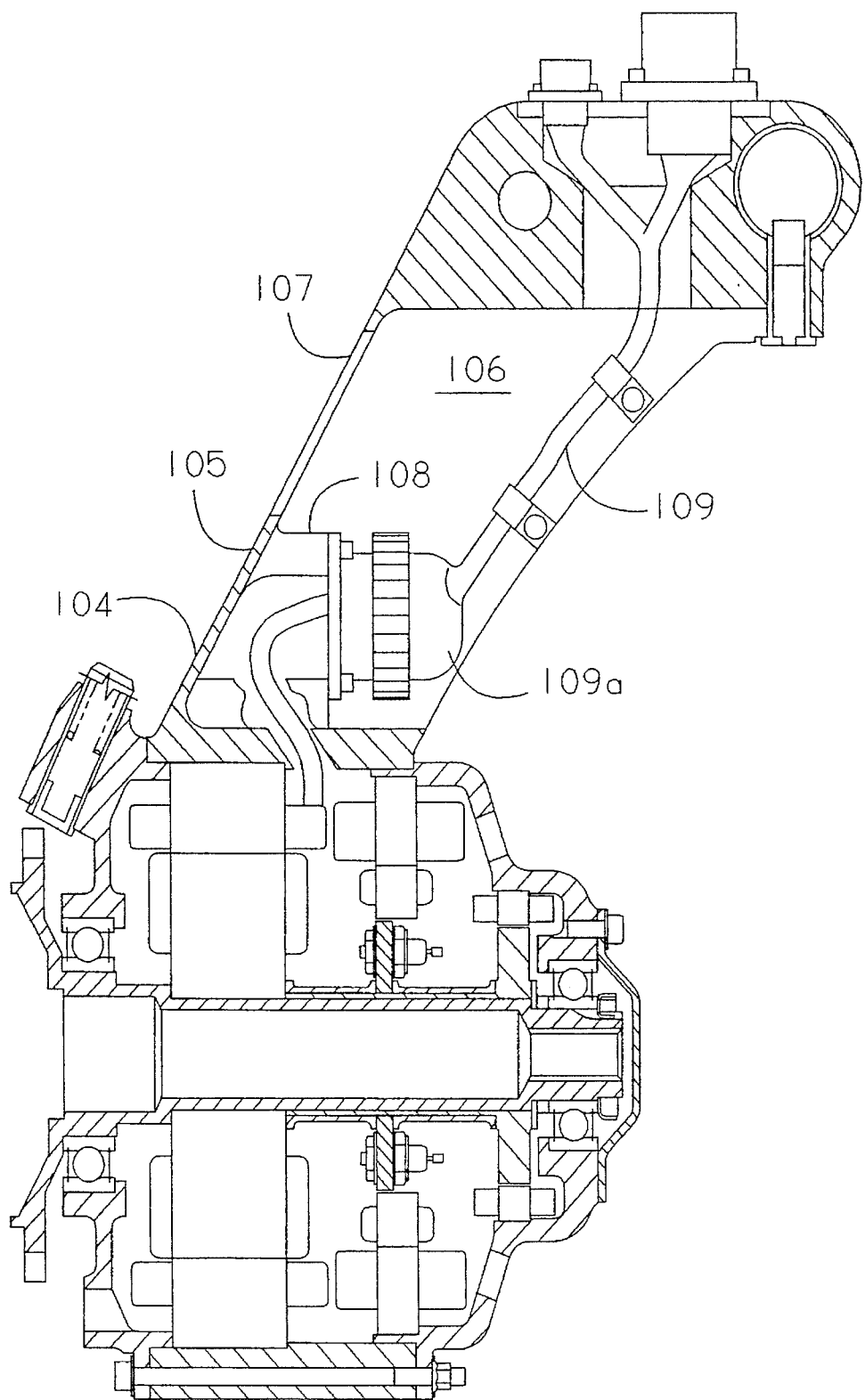
FIGS. 10 and 11 illustrate an alternate embodiment of the RAT driven emergency power unit of FIGS. 1 and 2.
Figure 11:
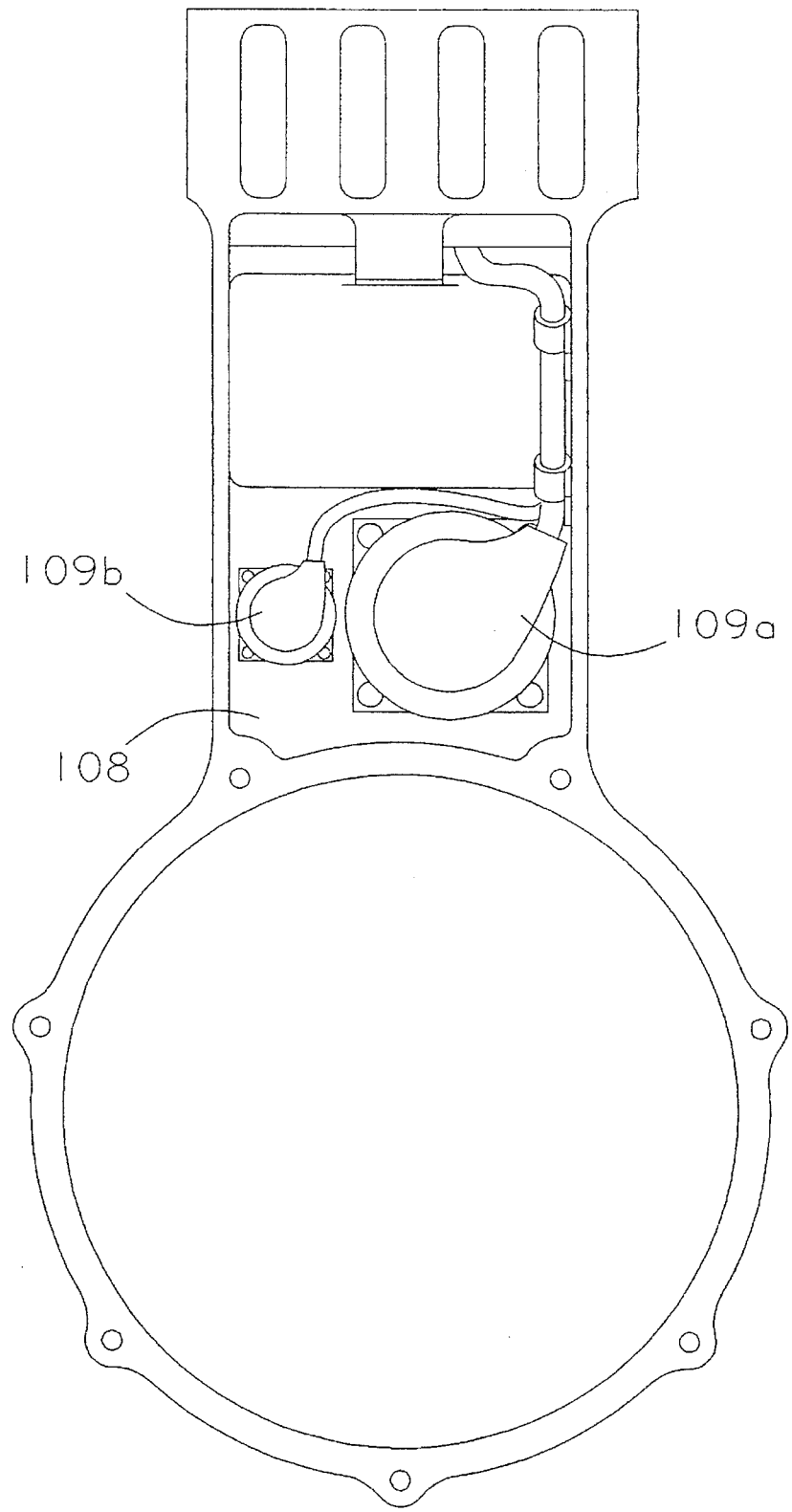

FIGS. 10 and 11 illustrate another embodiment of a strut 104, having a forward wall 105, and an axially opening channel 106 which faces axially away from the RAT blades. The forward wall 105 of strut 104 includes an opening 107 for passage of a portion of the airstream flowing through the RAT and past the strut 104. The strut 104 also includes a connector mounting boss 108. Connectors 109*a*, 109*b* from a wire harness 109 are utilized to provide an interconnection within the axially opening channel 106 such that the wire harness 109 may be replaced without removing the emergency power unit from the aircraft, thereby facilitating repair and assembly of the emergency power unit.

In the embodiment of the invention depicted in FIG. 2, the intermediate connectors 109*a*, 109*b* are eliminated. A conduit 114 is provided to conduct the wire harness 64 through the axially extending channel 23 of the strut 22. The conduit 114 may be installed subsequent to fabrication of the strut 22, or placed in the tool 77 to be molded or cast in place during fabrication of the strut 22.

Figure 12:
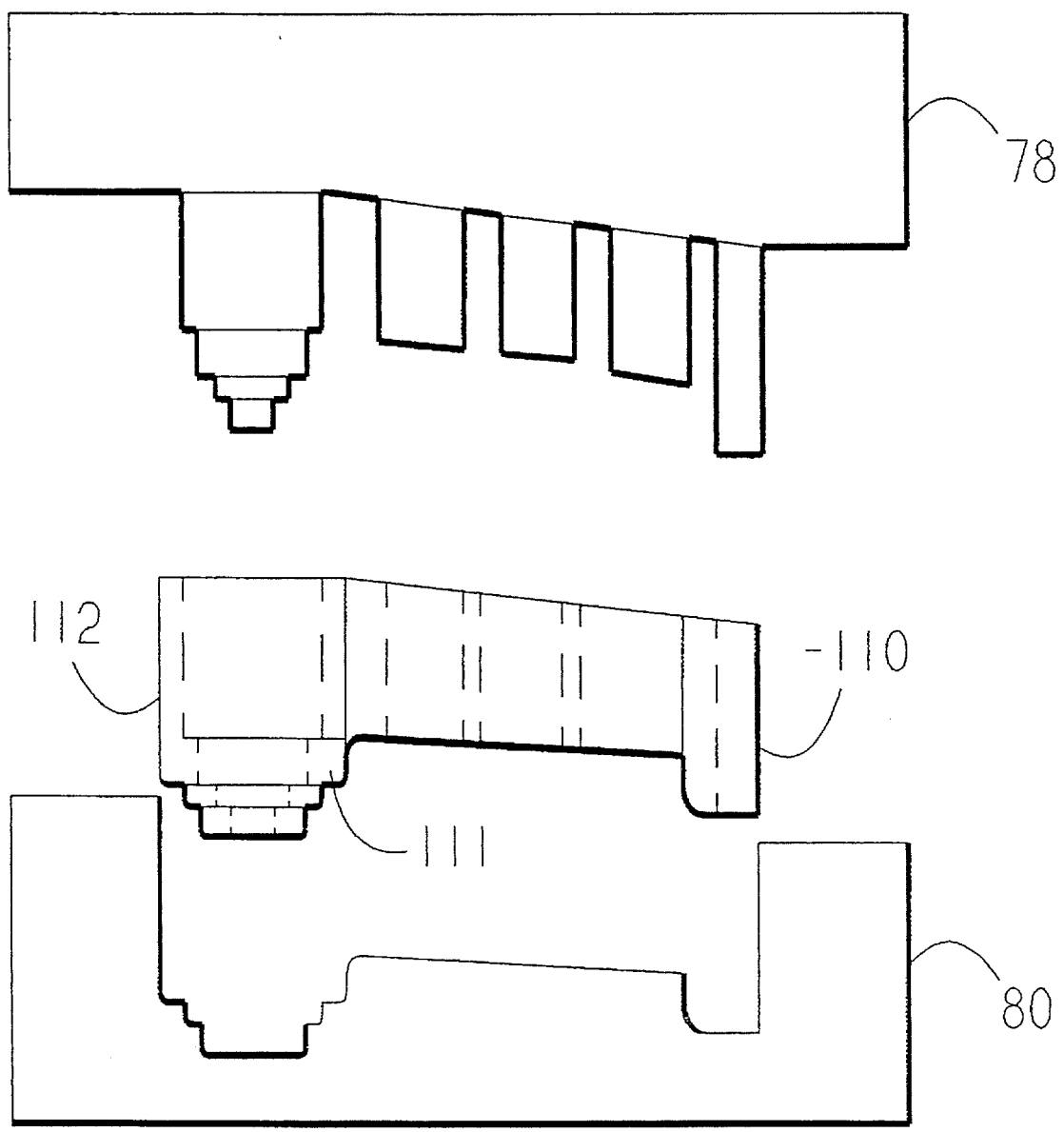
FIGS. 12 and 13 illustrate alternate embodiments of a support strut according to the invention.

FIG. 12 illustrates yet another embodiment of the strut 110 having an endbell portion 111 formed integrally with a housing portion 112 of the strut 110.

From the foregoing description, it will be appreciated that the RAT driven auxiliary power unit of the invention provides significant advantages in comparison to prior RAT driven power units.

By moving the power converting means to the distal end of the strut, and mounting such power converting means directly on the shaft of the RAT hub, a complex drivetrain is no longer required, thereby reducing cost and weight. Elimination of geartrain components also increases the mechanical power conversion efficiency of the auxiliary power unit.

Providing an axially opening channel in the strut allows the strut to be readily manufactured at low cost from a variety of materials including fiber reinforced composites. The axial opening channel in the strut also allows easy access to such electrical harnesses, hydraulic lines, or drive mechanisms as may be required to transfer power generated by the RAT to the aircraft. By allowing a portion of the airstream flowing through the RAT and past the strut to flow through the axially extending channel, blockage of the airstream by the strut is reduced, thereby allowing increased efficiency and life of the RAT and reduced noise generation.

By virtue of the structural configuration described herein, and particularly through the use of composite materials such as sheet molding compounds as taught herein, a strut having superior structural characteristics is provided.

Those skilled in the art will recognize that although the instant invention has been described herein with respect to a number of specific embodiments illustrating an aircraft emergency power unit having a RAT driven electrical generator mounted at the distal end of a strut, other embodiments are possible within the scope of the invention as it is described in appended claims.

Figure 14:
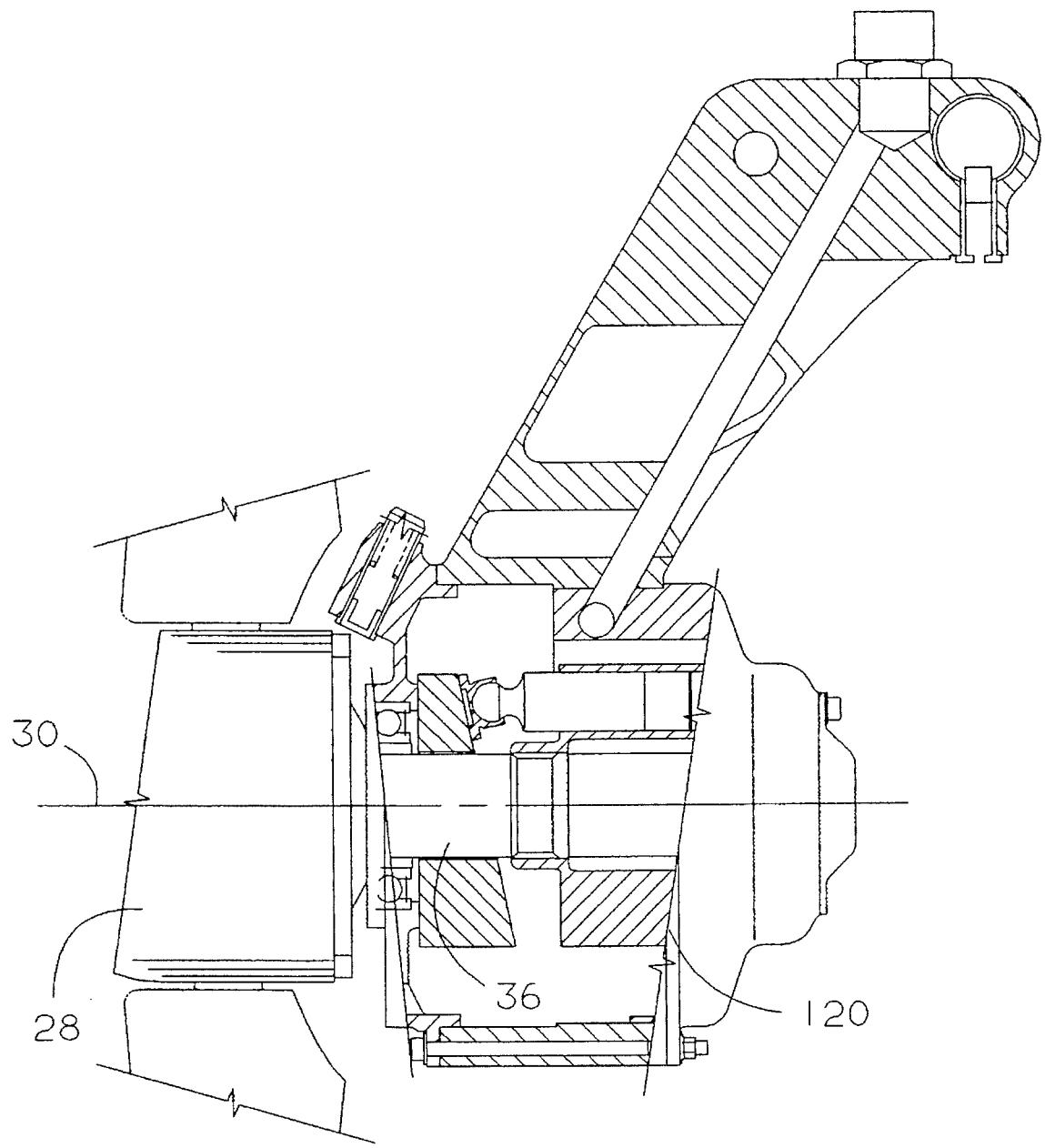
FIG. 14 illustrates a RAT driven emergency power unit for an air craft according to the invention having a ram air turbine driving a hydraulic pump.
Figure 15:
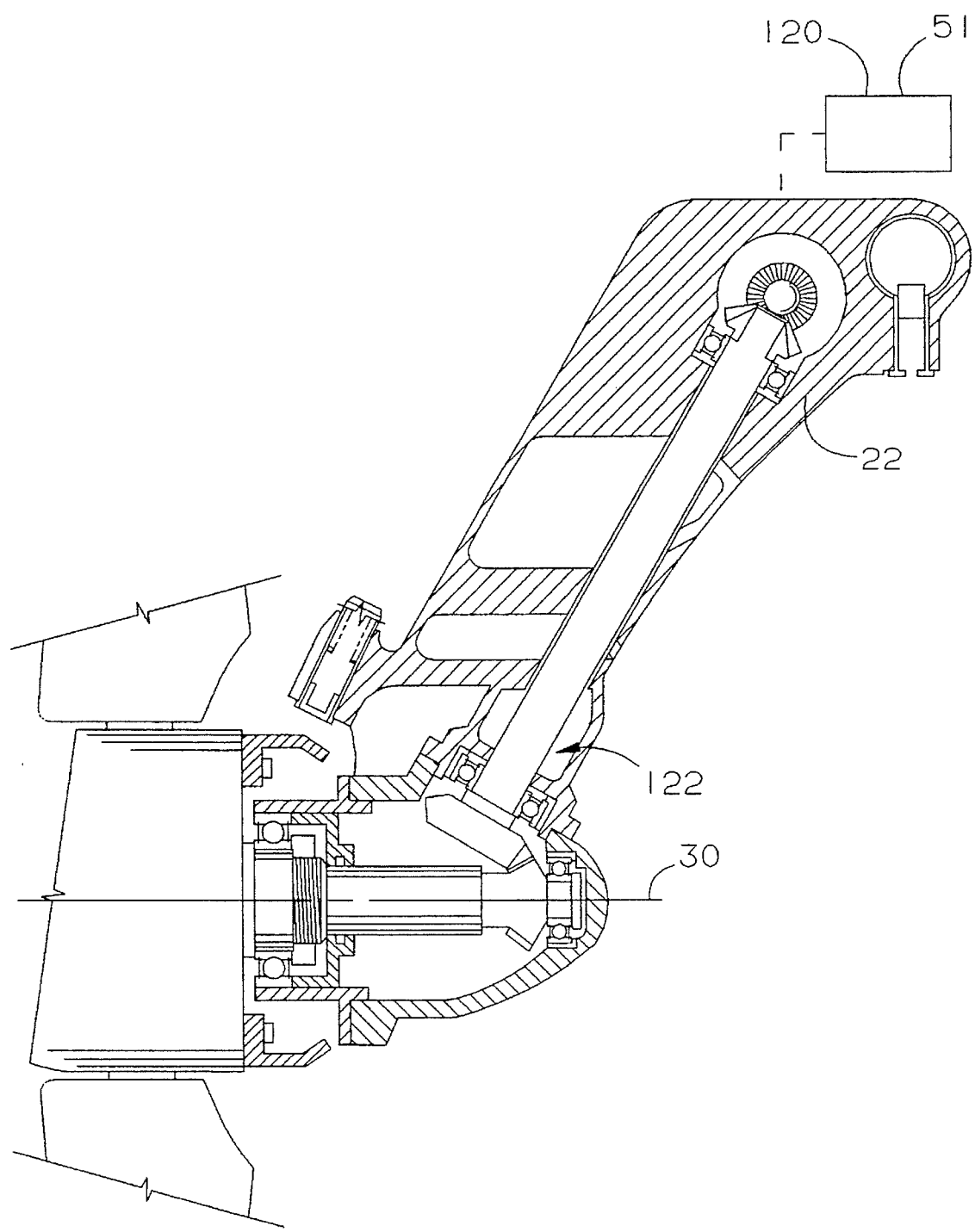
FIG. 15 illustrated a RAT driven emergency power unit for an aircraft according to the invention having a power converting device, such as a pump or a generator, located within the fuselage of the aircraft rather than at the distal end of the strut, and operatively connected to the ram air turbine by a drive train rather than being directly connected to the turbine shaft as in the embodiment illustrated in FIGS. 1 and 2.

In particular it will be understood that the electrical generator is just one example of a power converting device which could be utilized in such a RAT driven power unit. The power converting device could also be a hydraulic pump 120, as shown in FIG. 14, for example. The power converting device also need not be located at the distal end of the strut, and could be operatively connected to the RAT by a drive train 122, as shown in FIG. 15, rather than being mounted directly on the shaft 36 of the RAT hub 28. The wire harness of the exemplary embodiment in simply a specific exemplary means for interconnecting or operatively coupling power produced by the RAT to the aircraft. In alternate embodiments of the invention having different power converting devices, or alternate mounting arrangements for the power converting devices, a geartrain or hydraulic lines would be analogous structures to the wire harness of the exemplary embodiments specifically described herein.

It is therefore understood that the spirit and scope of the appended claims are not limited to the specific embodiments described and depicted herein.

We claim:

1. An auxiliary power unit for an aircraft comprising:
   a ram air driven turbine including blade means attached to a hub assembly which is rotatable about an axis of rotation; and
   a strut having mounting means at one end thereof for attaching said strut to the aircraft, and a housing at the other end thereof for attaching the hub assembly of the ram air driven turbine;

said housing and mounting means of said strut being rigidly connected by a central portion of said strut extending generally radially from said axis of rotation of the ram air turbine at a fixed angle from said axis of rotation;

said central portion of said strut including a first and a second leg member spaced with respect to one another so as to form an axially opening channel therebetween.

2. The auxiliary power unit of claim 1 wherein said axially opening channel extends substantially between said housing and mounting means of said strut.

3. The auxiliary power unit of claim 1 wherein said central section further includes a transversely extending wall mutually joining the first and second leg members, the housing, and the mounting means.

4. The auxiliary power unit of claim 3 wherein said axially opening channel faces axially away from said blade means.

5. The auxiliary power unit of claim 3 wherein said wall includes an opening for passage therethrough of a portion of an airstream flowing through the ram air driven turbine and past the strut, thereby reducing blockage by the strut of said portion of the airstream flowing through the ram air driven turbine and past the strut.

6. The auxiliary power unit of claim 1 wherein the strut is fabricated as a single unitary piece.

7. The auxiliary power unit of claim 1 wherein said strut is fabricated of a fiber reinforced composite material.

8. The auxiliary power unit of claim 7 wherein the composite material includes fibers having a length of one half inch or more suspended in a polymer matrix.

9. The auxiliary power unit of claim 8 wherein the strut is molded from a sheet molding compound including the fibers and polymer matrix.

10. The auxiliary power unit of claim 1 wherein the strut further includes one or more transverse support webs extending between the first and second leg members.

11. The auxiliary power unit of claim 1 wherein said mounting means is configured to allow pivotal movement about a pivot axis located within the aircraft such that the auxiliary power unit may be pivoted between a stowed position within the aircraft and a deployed position outside the aircraft.

12. The auxiliary power unit of claim 1 further including power converting means operatively coupled to be driven by the hub of the ram air driven turbine.

13. The auxiliary power unit of claim 12 further including means for operatively coupling said hub of said ram air driven turbine to said power converting means, with said means for operatively coupling passing through the axially opening channel in the central portion of the strut.

14. The auxiliary power unit of claim 13 wherein said means for operatively coupling include an interconnection located within the axially opening channel.

15. The auxiliary power unit of claim 12 wherein the power converting means are located within the aircraft.

16. The auxiliary power unit of claim 12 wherein the power generating means are located within the strut.

17. The auxiliary power unit of claim 13 wherein said means for operatively coupling said ram air driven turbine to said power converting means includes a geartrain.

18. The auxiliary power unit of claim 12 wherein the means for converting power is an electrical generator.

19. The auxiliary power unit of claim 12 wherein the power converting means is a hydraulic pump.

20. The auxiliary power unit of claim 16 wherein said power converting means are attached to said strut, and further including means for communicating power converted by the power converting means to the aircraft, with said means for communicating power passing through the axially opening channel in the central portion of the strut.

21. The auxiliary power unit of claim 20 wherein said means for communicating power include an interconnection located within the axially opening channel.

* * * * *